Sept. 9, 1969    H. D. DAIGH ET AL    3,465,736

EXHAUST RECYCLE CONTROL MECHANISM

Filed Oct. 9, 1967    4 Sheets-Sheet 1

INVENTORS.
HAROLD D. DAIGH
CLIFFORD H. COLLINS
BY
Donald W Canady
ATTORNEY.

INVENTORS.
HAROLD D. DAIGH
CLIFFORD H. COLLINS
BY
Donald W Canady
ATTORNEY.

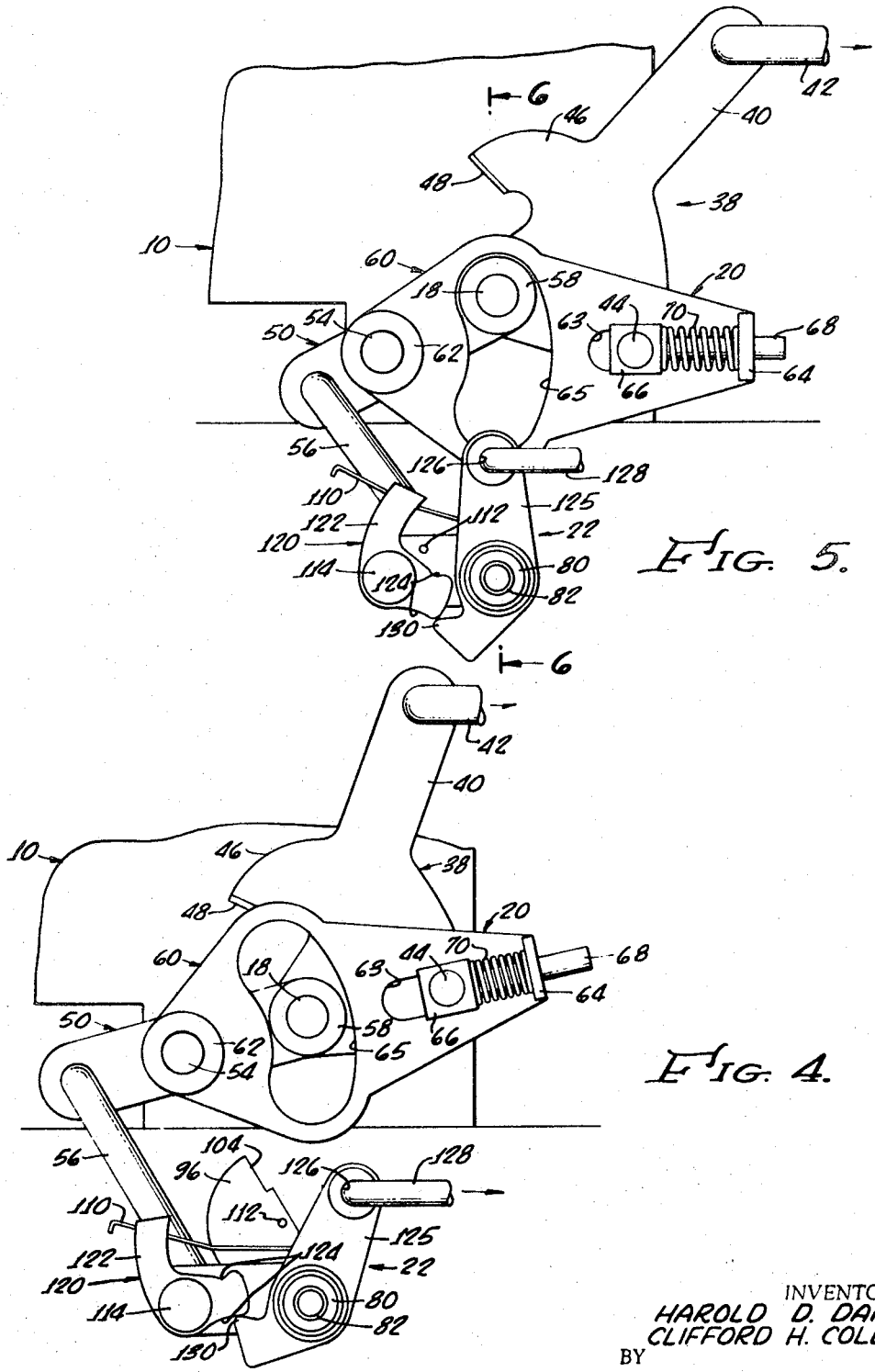

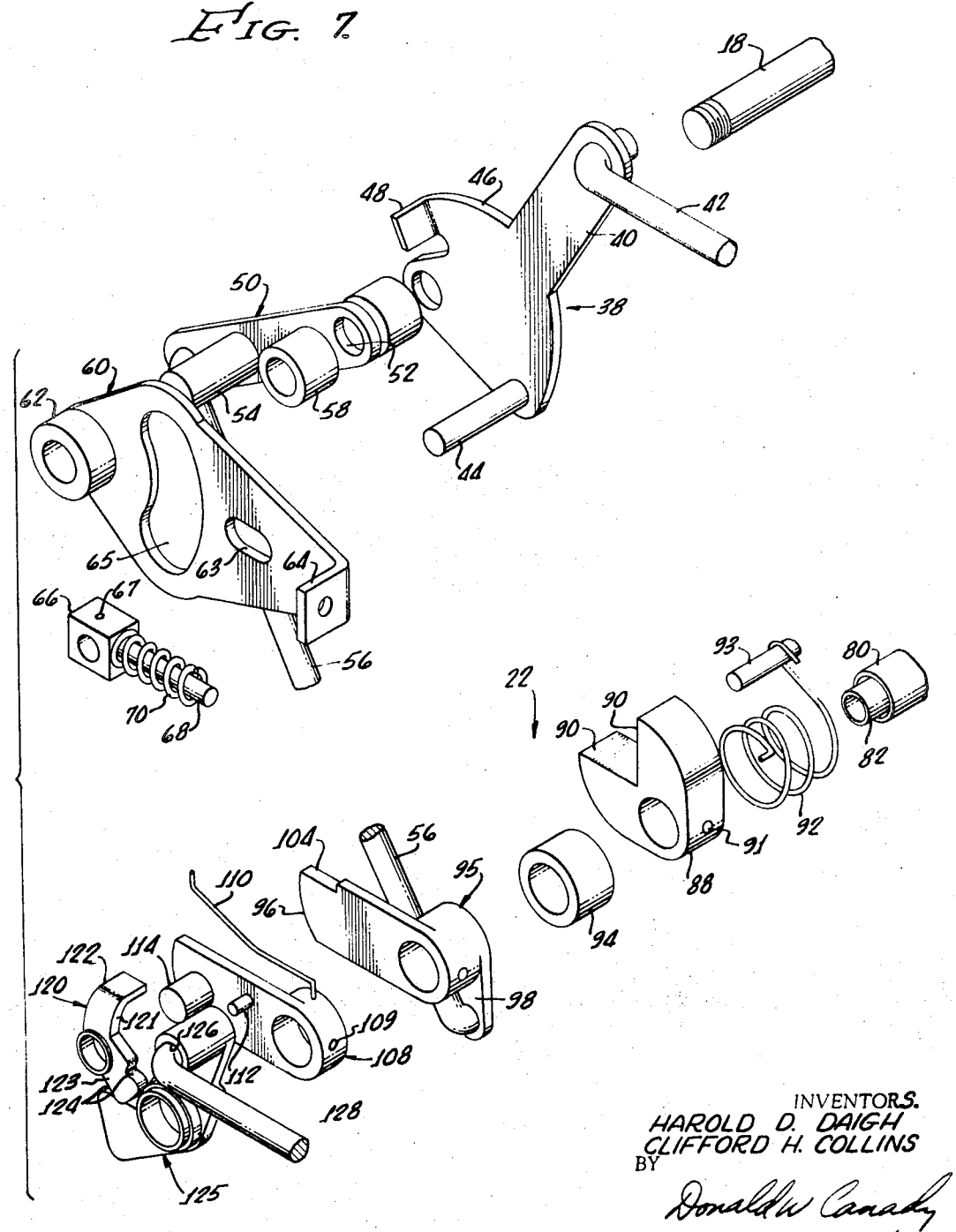

United States Patent Office 3,465,736
Patented Sept. 9, 1969

3,465,736
EXHAUST RECYCLE CONTROL MECHANISM
Harold D. Daigh, Rolling Hills, and Clifford H. Collins, Monterey Park, Calif., assignors to Atlantic Richfield Company, Philadelphia, Pa., a corporation of Pennsylvania
Filed Oct. 9, 1967, Ser. No. 673,843
Int. Cl. F02m 7/00
U.S. Cl. 123—119　　　　　　　　　　　　　　6 Claims

ABSTRACT OF THE DISCLOSURE

This application discloses an exhaust recycle valve control mechanism for use with internal combustion engines. The mechanism permits full opening of the exhaust recycle valve in correlation with the throttle valve accelerator mechanism position and enables the recycle valve to be maintained in full-open position for various positions of the accelerator mechanism up to and including wide-open or detent throttle position. At floor-board position, the control mechanism immediately closes the recycle valve for full power without exhaust dilution of the air-fuel mixture. The present mechanism includes an over-center device comprising a throttle lever arm, a recycle control lever arm, and an overcenter lever arm disposed on the throttle shaft and connected to the recycle control valve so that the recycle control valve is opened with the throttle at part-throttle positions of the accelerator mechanism and snaps closed at floor-board position.

---

Systems for recycling controlled amounts of exhaust recycle into the induction system of internal combustion engines have been proposed heretofore. In the system shown in U.S. Patent No. 3,237,615, Harold D. Daigh, issued Mar. 1, 1966, the recycle may be controlled by connecting the accelerator mechanism to the exhaust recycle valve. Such connection is made so that maximum exhaust is recycled at cruising speeds up to wide-open throttle and no exhaust is recycled at floor-board position of the accelerator mechanism. With the control mechanism shown in the aforementioned patent, the recycle valve is closed initially, opens at a predetermined throttle position and then gradually begins to close as the throttle valve accelerator mechanism moves from wide-open throttle position towards floorboard position. This gradual closing of the recycle valve permits recycling of exhaust gases while the accelerator is being depressed to floor-board position and hence only gradually closes the recycle valve so that full power is not attained by completely closing the recycle valve, until the accelerator mechanism reaches floor-board position.

Accordingly, one object of our present invention is to provide an exhaust recycle control system wherein the exhaust recycle control valve is instantaneously closed when the throttle valve accelerator mechanism reaches a predetermined position.

Another object of this invention is to provide an exhaust recycle valve control mechanism for recycling maximum amounts of exhaust gases up to a predetermined throttle valve accelerator mechanism position and then preventing the recycling of exhaust gases at the next position so that the engine may operate at full power.

Another object of this invention is to provide an exhaust recycle system which includes a recycle valve operated conjointly with the throttle valve and which immediately prevents recycle of exhaust gases when floor-board position has been attained.

These and other objects of this invention will become more fully apparent from the following description and appended claims when taken in conjunction with the drawings wherein:

FIG. 4 is a side elevation of the throttle control mechanism and the recycle valve control mechanism of FIG. 2 showing the throttle control mechanism in a center position immediately prior to floor-board position and showing the recycle control mechanism in open position;

FIG. 5 is a side elevation of the throttle control mechanism showing the throttle mechanism in floor-board position and showing the recycle control mechanism in closed position;

FIG. 7 is an exploded view in perspective of the throttle mechanism; and

FIG. 8 is an exploded view in perspective of the recycle control valve mechanism of this invention.

Briefly described, this invention relates to a recycle valve control mechanism employing an overcenter device which is operatively connected to the throttle valve shaft and to a latch or clutch mechanism on the exhaust recycle valve shaft for opening the recycle valve conjointly with the throttle valve and closing the recycle valve instantaneously when the accelerator mechanism is moved past a predetermined position.

It is desirable to recycle maximum exhaust at part-throttle positions of the accelerator mechanism by keeping the recycle valve 26 open at such positions and to substantially eliminate recycle at floor-board position when maximum power is needed. "Part-throttle" as used herein refers to the accelerator mechanism and includes its positions or settings between idle and floor-board. The expressions "detent" throttle, "full" throttle, and "wide-open" throttle which are used interchangeably, refer generally to the carburetor throttle but are considered for purposes of this specification, to be part-throttle positions with reference to the accelerator mechanism. "Cruising speed" throttle position is any of a variety of part-throttle positions and refers generally to any constant speed in the cruising range.

Figure 1:
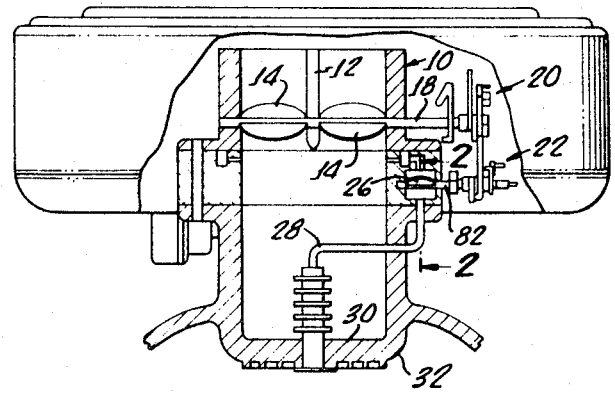
FIG. 1 is a front elevation, partially in section, of the carburetor and a portion of the induction system of an internal combustion engine.

FIG. 1 shows a carburetor 10 with double barrels 12 and conventional throttle valves 14 mounted on a throttle shaft 18. At the outer extremity of shaft 18 is mounted an overcenter throttle activating linkage 20 which operatively connects the vehicle accelerator pedal (not shown) to the throttle valve shaft. Device 20 is also operatively connected to a thermally activated recycle valve clutch mechanism 22 mounted on a recycle valve shaft for controlling the position of recycle valve 26. Exhaust recycle valve 26 is pivotally mounted in a recycle conduit 28 leading from the heat riser 30 and is in fluid communication with heat riser channel 32 and the exhaust manifold as best shown in U.S. Patent No. 3,237,615.

Figure 2:
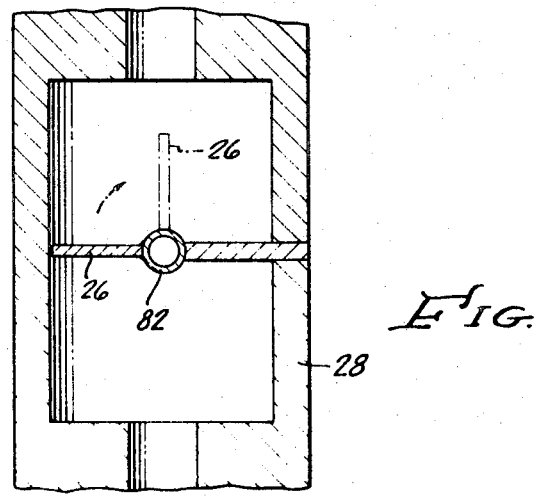
FIG. 2 is an enlarged sectional view of the recycle control valve taken substantially along line 2—2 of FIG. 1.

Exhaust recycle valve 26 pivots through an angle of 90 degrees as shown in FIG. 2. In the horizontal position of FIG. 2 exhaust recycle valve 26 is in substantially fluid tight association with exhaust gas conduit 28 and prevents recycle of exhaust gases into the induction system and combustion chambers of the engine. When exhaust recycle valve 26 is in the vertical position shown by the dashed lines of FIG. 2, maximum recycle of exhaust gases is effected from the heat riser channel back into the induction system of the engine.

Figure 3:
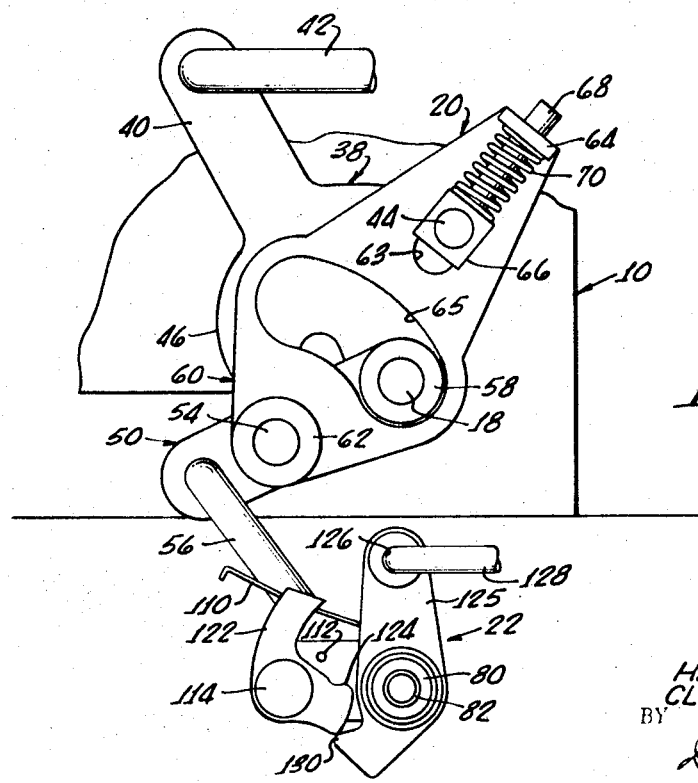
FIG. 3 is an enlarged side elevation of the throttle control mechanism and recycle control mechanism from FIG. 1 showing the throttle mechanism in idle position and showing the recycle control mechanism in closed position.

Referring now to FIG. 3 which shows overcenter mechanism 20 operatively connected on throttle shaft 18 and to recycle control mechanism 22. Mechanism 20 comprises three lever arms eccentrically mounted for pivoting through a predetermined angle about throttle shaft 18. The first lever arm is a throttle connected lever arm 38 which, as best shown in FIG. 7, is of irregular configuration having an upper arm portion 40 which is bored for receiving a connecting rod 42 which is also connected to the accelerator pedal (not shown) of the vehicle in the conventional manner. Lever arm 38 has a triangular shaped lower portion which is bored near the apex of one of the base angles for non-rotatably mounting the lever arm 38 on throttle shaft 18. A stub shaft 44 extends substantially parallel to throttle shaft 18 from a location near the other base angle for a reason to be discussed. Throttle connected lever arm 38 also carries a curved projection 46 which extends upwardly from one side edge thereof and then curves downwardly in the plane of throttle lever arm 38. A tang 48 extends from the end of projection 46 and acts as a stop member for limiting counter-clockwise rotation of lever arm 38.

Figure 6:
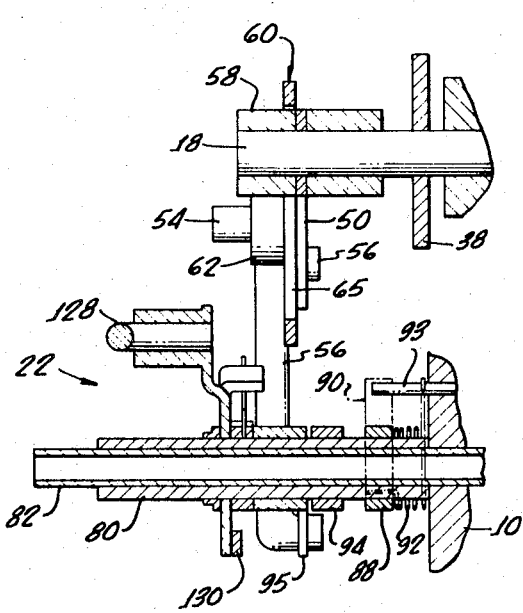
FIG. 6 is a sectional view of the throttle control mechanism and recycle valve control mechanism taken substantially along lines 6—6 of FIG. 5.

A recycle control lever arm 50 is rotatably mounted on shaft 18 adjacent throttle lever arm 38 (FIG. 6). As shown in FIG. 7, recycle control lever 50 carries a bore 52 at the upper end thereof for receiving shaft 18 and further carries a stub shaft 54 at the center portion thereof. The opposite end of lever 50 is also bored as shown in FIG. 3 for receiving one end of a connecting rod 56 which is connected at its opposite end to the recycle valve control mechanism 22. Recycle control lever 50 is maintained in an axially fixed position on shaft 18 by means of end bolt 58 which may be threadably mounted on the outer end of shaft 18 as shown in FIGS. 3–5.

An overcenter lever arm 60 is pivotally mounted on stub shaft 54 of recycle control lever 50 by means of a mating bushing 62 which fits over stub shaft 54. A laterally extending curved elliptical slot 65 is stamped in the central portion of overcenter arm 60 for passing bolt 58 therethrough. A longitudinally extending elliptical slot 63 is stamped from arm 60 near its opposite end for passing stub shaft 44 therethrough. The longitudinal axes of slots 63 and 64 are at substantially right angles to one another. A centrally bored tang 64 extends substantially perpendicular to the plane of arm 60 from one end thereof in a direction away from the carburetor as shown in FIG. 7. A centrally bored metallic cube 66 is mounted on the outer end of stub shaft 44 as by means of Allen set screw 67. Cube 66 carries a shaft 68 extending substantially perpendicular to its central bore. A helical tension spring 70 is axially mounted longitudinally about shaft 68 and, when cube 66 is in position on shaft 44, shaft 68 passes through the central bore of tang 64 and spring 70 abuts against the inner surface of tang 64 as shown in FIGS. 3–5. The outer end of shaft 44 extends through longitudinally extending elliptical slot 63 so that shaft 44 can be moved from one end of the elliptical slot to the opposite end substantially parallel to the longitudinal axis of arm 60. This movement causes compression and expansion of spring 70 as shown in FIGS. 3 through 5.

With reference now to FIGS. 3–7, it can be seen that lever arm 50 is connected to an exhaust recycle valve clutch mechanism 22 by means of connecting rod 56. Clutch mechanism 22 is axially mounted on a sleeve 80 (see FIG. 6), which is press fit about a recycle valve shaft 82 for rotation therewith. Clutch recycle mechanism 22 comprises a spring loaded limit defining bushing 88 which carries a pair of stop arms 90 disposed at substantially right angles to each other. Bushing 88 is adapted to be non-rotatably mounted on sleeve 80 by means such as Allen head set screw 91. Bushing 88 is spring loaded by means of a coil spring 92 which is connected at one end to bushing 88 and at the other end to a pin 93 which is conveniently connected to the valve cover or other fixed member of the automotive engine. A spacer bushing 94 may be axially disposed about sleeve 80 adjacent bushing 88 on the side opposite from spring 92.

A throttle activated bushing mounted bellcrank 95 is rotatably mounted on sleeve 80 on the opposite side of spacer 94, as shown in FIG. 7, so that it effectively floats on the sleeve. Bellcrank 95 is connected to the throttle lever by means of connecting rod 56, one end of which is mounted in an aperture in arm 98 of the bellcrank. The other lever arm 96 of bellcrank 95 carries a notch 104 at the outermost end thereof for a reason to be discussed.

A primary clutch lever arm 108 is non-rotatably mounted on sleeve 80 adjacent bellcrank 95 as shown in FIG. 7. Primary lever arm 108 may be non-rotatably mounted by means of Allen set screw 109. Lever arm 108 is provided with an upwardly extending bias spring 110 at its sleeve engaging end. As shown in FIG. 7, spring 110 extends upwardly, then rearwardly from the forward end of lever arm 108 and is bent upwardly at an angle of about 30 degrees from the horizontal at the mid portion thereof. Primary lever arm 108 also carries a pivot limit pin 112 extending perpendicular to the side thereof in an axial direction away from bellcrank 95 and a stub shaft 114 which extends in substantially the same direction.

A secondary clutch lever arm 120 is pivotally mounted on stub shaft 114. Secondary lever arm 120 comprises two legs 121 and 123 connected at substantially right angles to each other. The upper leg 121 carries a clutch dog 122. The lower leg 123 carries a pair of indentations 124 located on the upper and lower edges thereof (see FIGS. 3–5). An activator member 125, is axially disposed about sleeve 80 adjacent lever arms 108 and 120 on sleeve 80. Activator 125 is rotatably mounted on sleeve 80 and includes two outwardly extending arms. One of the arms carries an annular socket 126 for receiving an activating rod 128. Rod 128 may be connected to the automatic choke of the vehicle or to a push-pull knob on the vehicle dashboard (neither shown). The other arm of activator 125 extends in a direction substantially opposite the first arm and carries a lug 130 at the outermost end thereof. Lug 130 extends axially toward lever arm 108 and 120 as shown in FIG. 6, and is adapted to contact lower indentations 124 of secondary lever arm 120.

In operation of the throttle connected overcenter device and the exhaust recycle clutch mechanism shown in FIGS. 3–7, it should be noted that each of these mechanisms can be used independently of the other. In other words, it is possible to use the overcenter device in conjunction with an exhaust recycle device other than the specifically disclosed clutch mechanism 20. It is also possible to use the clutch mechanism without correspondingly using a throttle connected overcenter linkage. The prime function of the overcenter device is to conjointly open the recycle valve with the throttle valve and instantaneously snap the recycle valve closed when the accelerator mechanism is depressed beyond wide-open position to floor-board position. This is accomplished without partial closing of the recycle valve just prior to floor-board position. The device is shown in the idle position in FIG. 3. In this condition, throttle connected lever arm 38 is pivoted to the extreme left closing the throttle valves. As connecting rod 42 is moved to the right in FIG. 3, throttle shaft 18 is rotated clockwise opening throttle valves 14. Conjointly therewith rod 56 through bellcrank 95 and the other linkage of clutch mechanism 22 causes clockwise rotation of exhaust recycle valve 26 from the full-closed position shown in solid lines in FIG. 2, to the full-open position shown in dashed lines in FIG. 2.

Connecting rod 56 rotates exhaust recycle valve shaft 82 in response to pivotal movement of lever rod 50 in a clockwise direction which is effected by rotational movement of throttle connected lever arm 38 and overcenter arm 60. Overcenter arm 60 acts as a solid connecting link between stub shaft 44 on lever arm 38 and stub shaft 54 on lever arm 50 during the initial states of rotation of the throttle connected lever arm 38. During initial rotation of the lever arm 38, overcenter arm 60 pivots about sleeve 58 in slot 65 thereby causing clockwise rotation of lever arm 50. When recycle valve 26 reaches its full open position as shown by the dashed lines in FIG. 2, however, one of stop arms 90 comes into contact with pin 93 thereby preventing further rotation of the recycle valve shaft 82. As the throttle valve 14 is opened further by additional clockwise rotation of the throttle connected lever arm 38 and stub shaft 44, as shown in FIGS. 3–5, lever arm 50 is restricted from further rotation in a clockwise direction by rod 56 and thus overcenter arm 60 is forced to pivot about stub shaft 54 on lever arm 50. Due to the radius of curvature of the path traversed by shaft 44 and the curvature of elliptical slot 65, spring 70 is compressed against tang 64 as overcenter arm 60 pivots and slot 65 on overcenter arm 60 passes over end bolt 58. FIG. 4 shows spring 70 in its most fully compressed position with overcenter arm 60 pivoted partially about stub shaft 54 so that bolt 62 is in the center of slot 65. When arm 60 moves over its center position, the mechanism suddenly snaps into the position shown in FIG. 5 since arm 60 is moved downwardly by expansion of spring 70.

As overcenter arm 60 snaps downwardly into the position shown in FIG. 4, lever arm 50 pivoted counterclockwise about shaft 18 returning mechanism 22 and the recycle valve 26 to the closed position. When overcenter arm 60 snaps downwardly, bellcrank 95 returned to the position shown in FIG. 8.

Rod 128, as noted, may be connected to either a thermal sensing element or to a push-pull knob on the vehicle dashboard. When the rod is moved to the right of FIGS. 3–5, activator arm 125 rotates clockwise bringing lug 130 into engagement with indentation 124. Further rotation of activator 125 pivots secondary lever arm 120 counterclockwise moving dog 122 out of notch 104 on bellcrank 95 so that the rotation of bellcrank 95 does not cause opening of the recycle valve as shown in FIG. 4. Thus, bellcrank 95, rod 56 and the throttle overcenter interlock device are only drivingly connected to the recycle valve shaft when clutch dog 122 engages notch 104 of the bellcrank. Clutch dog 122 latches rotatably mounted bellcrank 95 to non-rotatably mounted lever arm 108 for opening of the recycle valve. By providing a thermal sensing element for activating rod 128, the recycle valve can be made to open only when the temperature of the engine exceeds a predetermined level. For a more detailed discussion of such an arrangement see copending application, Ser. No. 658,903 of Harold D. Daigh, filed Aug. 7, 1967 for a "Control Mechanism for Exhaust Recycle System."

We claim:

1. In an internal combustion engine driven vehicle having an exhaust recycle system, a mechanism for controlling the amount of exhaust gases recycled including an exhaust recycle valve in fluid communication with the exhaust manifold and the induction system of said internal combustion engine and connected to the accelerator mechanism of said vehicle for conjoint operation therewith, the improvement comprising: means connecting said exhaust recycle valve and said accelerator mechanism for opening said exhaust recycle valve conjointly with said accelerator mechanism to a full open position of said exhaust recycle valve and for maintaining said exhaust recycle valve in said full open position until said accelerator mechanism is moved to a predetermined position beyond full open position, and means for instantaneously closing said recycle valve when said accelerator mechanism has reached said predetermined position.

2. A recycle control mechanism as defined in claim 1 wherein said means for maintaining said recycle valve in full open position includes an overcenter connecting device which allows movement between two positions each of which corresponds to a closed position of said exhaust recycle valve through a center position which corresponds to an open position of said exhaust recycle valve.

3. A mechanism as defined in claim 2 wherein said overcenter device comprises a first lever arm non-rotatably mounted on the throttle valve shaft, a second lever arm pivotally mounted on said throttle valve shaft and operatively connected to said recycle valve, and a spring biased overcenter lever arm eccentrically connecting said throttle connected lever arm and said recycle valve connected lever arm for effecting rotation of said recycle valve connected lever arm about the throttle valve shaft conjointly with said throttle connected lever arm, means for blocking rotation of said recycle valve connected lever arm beyond a predetermined position and means for returning said recycle valve connected lever arm to its original position upon rotation of said throttle connected lever arm beyond a predetermined position.

4. A mechanism as defined in claim 2 wherein said overcenter device includes an overcenter arm having a curved slot in the central portion thereof for operatively connecting the outer end of the throttle valve shaft to said recycle valve and a longitudinally extending slot near one end thereof for spring mounting a throttle connected shaft.

5. A mechanism as defined in claim 2 wherein said overcenter device is operatively connected to said recycle valve by means of a clutch mechanism which operatively disconnects said recycle valve from said overcenter device when the temperature of said engine is below a predetermined level.

6. The apparatus of claim 2 wherein said recycle valve returns from a closed position at floor board accelerator mechanism position to open position when said throttle is reduced.

References Cited

UNITED STATES PATENTS

| 2,114,548 | 4/1938 | Stadlman. |
|---|---|---|
| 2,154,417 | 4/1939 | Anderson _____ 123—119 |
| 2,354,179 | 7/1944 | Blanc. |
| 2,419,747 | 4/1947 | Wassman. |
| 2,421,406 | 6/1947 | Bicknell. |
| 2,722,927 | 11/1955 | Cornelius. |
| 3,237,615 | 3/1966 | Daigh. |

AL LAWRENCE SMITH, Primary Examiner